(12) United States Patent
Lownsbrough (10) Patent No.: US 7,343,398 B1
(45) Date of Patent: Mar. 11, 2008

(54) METHODS, APPARATUSES AND SYSTEMS FOR TRANSPARENTLY INTERMEDIATING NETWORK TRAFFIC OVER CONNECTION-BASED AUTHENTICATION PROTOCOLS

(75) Inventor: Derek Leigh Lownsbrough, Kelowna (CA)

(73) Assignee: Packeteer, Inc., Cupertino, CA (US)

( * ) Notice: Subject to any disclaimer, the term of this patent is extended or adjusted under 35 U.S.C. 154(b) by 728 days.

(21) Appl. No.: 10/234,661

(22) Filed: Sep. 4, 2002

(51) Int. Cl.
*G06F 15/16* (2006.01)
(52) U.S. Cl. .................................. 709/218; 709/229
(58) Field of Classification Search ............... 709/229; 726/3, 5–8, 10
See application file for complete search history.

(56) References Cited

U.S. PATENT DOCUMENTS

| | | | |
|---|---|---|---|
| 4,018,993 A | 4/1977 | Edstrom | |
| 4,135,156 A | 1/1979 | Sanders et al. | |
| 4,599,647 A | 7/1986 | George et al. | |
| 4,686,698 A | 8/1987 | Tompkins et al. | |
| 4,720,873 A | 1/1988 | Goodman et al. | |
| 4,724,520 A | 2/1988 | Athanas et al. | |
| 4,736,422 A | 4/1988 | Mason | |
| 4,775,974 A | 10/1988 | Kobayashi | |
| 4,777,657 A | 10/1988 | Gillaspie | |
| 4,793,813 A | 12/1988 | Bitzer et al. | |
| 4,802,215 A | 1/1989 | Mason | |
| 4,829,569 A | 5/1989 | Seth-Smith et al. | |
| 4,841,526 A | 6/1989 | Wilson et al. | |
| 4,924,303 A | 5/1990 | Brandon et al. | |
| 4,933,936 A | 6/1990 | Rasmussen et al. | |
| 4,940,963 A | 7/1990 | Gutman et al. | |
| 4,959,872 A | 9/1990 | Imai et al. | |
| 5,014,265 A | 5/1991 | Hahne et al. | |
| 5,019,910 A | 5/1991 | Filmer | |
| 5,029,207 A | 7/1991 | Gammie | |
| 5,058,138 A | 10/1991 | Figura et al. | |
| 5,101,267 A | 3/1992 | Morales-Garza | |
| 5,101,478 A | 3/1992 | Fu et al. | |
| 5,111,504 A | 5/1992 | Esserman et al. | |
| 5,131,010 A | 7/1992 | Derrenge et al. | |
| 5,157,662 A | 10/1992 | Tadamura et al. | |

(Continued)

FOREIGN PATENT DOCUMENTS

JP  63107254  5/1988

(Continued)

OTHER PUBLICATIONS

Ratnam, Karumaharan and Matta, Ibrahim, "Effect of Local Retransmission at Wireless Access Points on the Round Trip Time Estimation of TCP," 0-8186-8418, IEEE 1998.

(Continued)

*Primary Examiner*—John Follansbee
*Assistant Examiner*—Alan S Chou
(74) *Attorney, Agent, or Firm*—Mark J. Spolyar (57) ABSTRACT

Methods, apparatuses and systems allowing for the transparent intermediation of network traffic over connection-based authentication protocols. In one embodiment, the present invention allows a proxy to be placed into an NTLM or HTLMv2 environment and have it transparently ensure that NTLM transactions are handled appropriately, such that the proxy can interact (optimize/accelerate) with the authenticated content without breaking the authentication scheme. Embodiments of the present invention provide a proxy solution that is easily deployed and transparently fits into an existing NTLM environment.

13 Claims, 6 Drawing Sheets

U.S. PATENT DOCUMENTS

| | | | |
|---|---|---|---|
| 5,159,592 | A | 10/1992 | Perkins |
| 5,161,194 | A | 11/1992 | Ujiie |
| 5,163,046 | A | 11/1992 | Hahne et al. |
| 5,181,200 | A | 1/1993 | Harrison |
| 5,193,151 | A | 3/1993 | Jain |
| 5,223,923 | A | 6/1993 | Morales-Garza |
| 5,237,610 | A | 8/1993 | Gammie et al. |
| 5,249,164 | A | 9/1993 | Koz |
| 5,257,369 | A | 10/1993 | Skeen et al. |
| 5,303,042 | A | 4/1994 | Lewis et al. |
| 5,309,351 | A | 5/1994 | McCain et al. |
| 5,313,454 | A | 5/1994 | Bustini et al. |
| 5,319,705 | A | 6/1994 | Halter et al. |
| 5,319,707 | A | 6/1994 | Wasilewski et al. |
| 5,319,712 | A | 6/1994 | Finkelstein et al. |
| 5,321,542 | A | 6/1994 | Freitas et al. |
| 5,335,276 | A | 8/1994 | Thompson et al. |
| 5,337,044 | A | 8/1994 | Folger et al. |
| 5,341,425 | A | 8/1994 | Wasilewski et al. |
| 5,347,304 | A | 9/1994 | Moura et al. |
| 5,359,367 | A | 10/1994 | Stockill |
| 5,367,571 | A | 11/1994 | Bowen et al. |
| 5,387,994 | A | 2/1995 | McCormack et al. |
| 5,394,561 | A | 2/1995 | Freeburg |
| 5,400,401 | A | 3/1995 | Wasilewski et al. |
| 5,404,505 | A | 4/1995 | Levinson |
| 5,404,583 | A | 4/1995 | Lalezari et al. |
| 5,412,660 | A | 5/1995 | Chen et al. |
| 5,420,866 | A | 5/1995 | Wasilewski |
| 5,426,635 | A | 6/1995 | Mitra et al. |
| 5,430,709 | A | 7/1995 | Galloway |
| 5,452,357 | A | 9/1995 | Naccache |
| 5,465,213 | A | 11/1995 | Ross |
| 5,481,609 | A | 1/1996 | Cohen et al. |
| 5,506,904 | A | 4/1996 | Sheldrick et al. |
| 5,526,404 | A | 6/1996 | Wiedeman et al. |
| 5,564,076 | A | 10/1996 | Auvray |
| 5,568,554 | A | 10/1996 | Eastlake |
| 5,572,530 | A | 11/1996 | Chitre et al. |
| 5,586,121 | A | 12/1996 | Moura et al. |
| 5,590,200 | A | 12/1996 | Nachman et al. |
| 5,592,173 | A | 1/1997 | Lau et al. |
| 5,594,490 | A | 1/1997 | Dawson et al. |
| 5,594,776 | A | 1/1997 | Dent |
| 5,594,782 | A | 1/1997 | Zicker |
| 5,608,446 | A | 3/1997 | Carr |
| 5,627,528 | A | 5/1997 | Kuznicki |
| 5,634,190 | A | 5/1997 | Wiedeman |
| 5,652,795 | A | 7/1997 | Dillon et al. |
| 5,659,350 | A | 8/1997 | Hendricks et al. |
| 5,764,886 | A | 6/1998 | Danielson et al. |
| 5,784,358 | A | 7/1998 | Smith et al. |
| 5,850,517 | A | 12/1998 | Verkler et al. |
| 5,852,721 | A | 12/1998 | Dillon et al. |
| 5,896,558 | A | 4/1999 | Wiedeman |
| 5,897,622 | A | 4/1999 | Blinn et al. |
| 5,912,883 | A | 6/1999 | Hershberg |
| 5,968,129 | A | 10/1999 | Dillon et al. |
| 5,995,725 | A | 11/1999 | Dillon |
| 5,995,726 | A | 11/1999 | Dillon |
| 6,006,275 | A | 12/1999 | Picazo, Jr. et al. |
| 6,014,378 | A | 1/2000 | Christie et al. |
| 6,016,388 | A | 1/2000 | Dillon |
| 6,038,216 | A | 3/2000 | Packer |
| 6,041,356 | A | 3/2000 | Mohammed |
| 6,052,718 | A | 4/2000 | Gifford |
| 6,067,561 | A | 5/2000 | Dillon |
| 6,098,108 | A | 8/2000 | Sridhar |
| 6,101,189 | A | 8/2000 | Tsuruoka |
| 6,115,384 | A | 9/2000 | Parzych |
| 6,130,880 | A | 10/2000 | Naudus et al. |
| 6,160,797 | A | 12/2000 | Robert, III |
| 6,161,141 | A | 12/2000 | Dillon |
| 6,205,473 | B1 | 3/2001 | Thomasson et al. |
| 6,208,656 | B1 | 3/2001 | Hrastar et al. |
| 6,212,565 | B1 * | 4/2001 | Gupta ........................ 709/229 |
| 6,215,776 | B1 | 4/2001 | Chao |
| 6,229,809 | B1 | 5/2001 | Murphy et al. |
| 6,292,839 | B1 | 9/2001 | Naudus et al. |
| 6,298,041 | B1 | 10/2001 | Packer |
| 6,324,582 | B1 | 11/2001 | Sridhar et al. |
| 6,338,131 | B1 | 1/2002 | Dillon |
| 6,377,992 | B1 | 4/2002 | Plaza Fernandez et al. |
| 6,385,175 | B1 | 5/2002 | Dove |
| 6,415,329 | B1 | 7/2002 | Gelman et al. |
| 6,460,085 | B1 | 10/2002 | Toporek |
| 6,519,651 | B1 | 2/2003 | Dillon |
| 6,529,477 | B1 | 3/2003 | Toporek |
| 6,571,296 | B1 | 5/2003 | Dillon |
| 6,584,083 | B1 | 6/2003 | Toporek |
| 6,643,701 | B1 * | 11/2003 | Aziz et al. .................. 709/227 |
| 6,654,344 | B1 | 11/2003 | Toporek |
| 6,704,798 | B1 * | 3/2004 | Mogul ........................ 709/246 |
| 6,934,255 | B1 | 8/2005 | Toporek |
| 6,959,318 | B1 * | 10/2005 | Tso ............................ 709/203 |
| 7,054,902 | B2 | 5/2006 | Toporek |
| 7,055,028 | B2 * | 5/2006 | Peiffer et al. ................ 713/151 |
| 2002/0062384 | A1 * | 5/2002 | Tso ............................ 709/229 |
| 2002/0087981 | A1 | 7/2002 | Daniels |
| 2002/0157019 | A1 * | 10/2002 | Kadyk et al. ............... 713/201 |
| 2003/0005280 | A1 * | 1/2003 | Bobde et al. ............... 713/150 |

FOREIGN PATENT DOCUMENTS

JP            10051499            2/1998

OTHER PUBLICATIONS

Zhang, et al. "Satellite Communications in the Global Internet: Issues, Pitfalls and Potential", Proceedings of the 7th Annual Conference of the Internet Society, INET97, Jul. 19, 1997, Retrieved from the internet: URL: http://web.archive.org/web/19970729040623/http://www.isoc.org/inet97/proceedings/F5/F5_1.HTM.

Stadler, J. S., et al. "Performance Enhancement for TCP/IP on a Satellite Channel", Military Communications Conference, 1998. IEEE 1998.

Bakre, et al. "I-TCP: Indirect TCP for Mobile Hosts" IEEE Comp. Soc. Press, US, vol. Conf. 15, May 1995.

Partridge, C., et al., "TCP/IP Performance over Satellite Links", IEEE Network, IEEE New York, US, vol. 11, No. 5, Sep. 1997.

* cited by examiner

METHODS, APPARATUSES AND SYSTEMS FOR TRANSPARENTLY INTERMEDIATING NETWORK TRAFFIC OVER CONNECTION-BASED AUTHENTICATION PROTOCOLS

CROSS-REFERENCE TO RELATED APPLICATIONS

This application makes reference to the following commonly owned U.S. patent applications and patents, which are incorporated herein by reference in their entirety for all purposes:

U.S. patent application Ser. No. 09/684,372 in the name of Jennifer Nyland, Tom Taylor, Paul L. Archard, Derek L. Lownsbrough, Troy Ihmels, and Ben Nyland, entitled "Serving Appropriate Content in a Network Environment Based on Attributes of Disparate Clients;"

U.S. patent application Ser. No. 09/846,117 in the name of Derek Leigh Lownsbrough and Paul Leslie Archard, entitled "System and Method for Efficiently Forwarding Client Requests from a Proxy Server in a TCP/IP Computing Environment;"

U.S. patent application Ser. No. 09/967,481 in the name of Paul L. Archard and John Tavs, entitled "System and Method for Providing integrated Secured and Optimized Packet Messaging;" and U.S. patent application Ser. No. 10/038,751 in the name of Paul Leslie Archard and Derek Leigh Lownsbrough, entitled "System and Method for Transparently Providing Access to Optimized Data in an Intermediate Cache to a Plurality of Heterogeneous Clients."

FIELD OF THE INVENTION

The present invention relates to proxy servers and, more particularly, to methods, apparatuses and systems for transparently intermediating network traffic over connection-based authentication protocols.

BACKGROUND OF THE INVENTION

Efficient allocation and utilization of network resources, such as available network bandwidth, has become critical as enterprises increase reliance on distributed computing environments and wide area computer networks to accomplish critical tasks. Indeed, web-based applications drive an ever-increasing portion of a business enterprise's activities and revenues. When productivity and profits depend on response times, the acceleration of web-based applications is an essential component to success.

Network-based applications, whether they take the form of on-line marketplaces, distance learning, enterprise resource planning (ERP), customer relationship management (CRM), or other critical applications, face significant performance hurdles. One significant obstacle to the performance of web-based applications is that a significant number of remote users access network resources at slow connection speeds (e.g., 56 Kbps). In addition, the growing need for secure network transactions places a significant strain on server resources which adversely impact response times. For example, applications requiring secure transactions using resource-intensive Secure Sockets Layer (SSL) technology sap web server resources, severely reducing the number of transactions a given web server can handle and increasing response times. In light of these considerations and others, application and content developers and often faced with the undesirable tradeoff between providing a rich user experience and acceptable performance.

In response, internet content or network application accelerators have been developed to speed the delivery of content to remote users. For example, the AppCelera™ ICX Internet content accelerator combines compression, conversion and caching techniques to optimize static and dynamic content to each remote user's connection speed and browser, as well as other aspects of the remote user's connection profile (e.g., network access device type and capabilities). Typically, such content accelerators are deployed in front of web or other network servers and in the communications path between such servers and remote users. These content accelerators essentially act as proxy servers performing such functions as connection multiplexing, reverse proxy caching, compression, etc. to optimize virtual end-to-end connections between servers and remote users. For example, in order to reduce overhead associated with establishing TCP connections, certain content accelerators maintain one or more persistent connections to the servers and pass requests from remote users over these connections to the servers.

Network servers often implement authentication functionality to secure and control access to data. For example, authentication mechanisms typically rely on a challenge-response authentication protocol to validate or authenticate remote users. It is desirable for network application accelerators to operate in a transparent manner to optimize network traffic associated with network authentication and security mechanisms. Certain authentication mechanisms, however, are connection-based, relying on implicit end-to-end state, which is problematic to the insertion in the client-server connection of a proxy for such functions as content acceleration and other optimizations. For example, Microsoft's Internet information Services (IIS) web server utilizes an authentication mechanism (NTLM—NT Lan-Manager) that integrates with Windows domain authentication for authenticating client systems attempting to access content on the web server. IIS and Internet Explorer (IE) can use this type of authentication over HTTP. However, the introduction of a proxy server between the IE client and the IIS server compromises the NTLM authentication scheme, because there is no longer an end-to-end connection between the IE client and the IIS server. When a proxy is inserted between client(s) and an origin server using NTLM, clients are often forced to re-authenticate themselves numerous times during a single browsing session. In addition, since the NTLM server assumes that any request received over an authenticated connection comes from the authenticated source, the use of connection multiplexing becomes problematic as it may allow unauthenticated clients access to content or other data requiring authentication.

NTLM is a proprietary connection based authentication mechanism, developed by Microsoft Corporation®, that relies on implicit end-to-end state. The HTTP/1.1 specification states that all state is hop-by-hop only; therefore, using NTLM for HTTP traffic is prone to many HTTP compliance difficulties and breaks when there are any proxies (hops) between the client and the server. In fact, a Microsoft knowledge base article (Q198116—Authentication Options and Limitations using Proxy Server 2.0) states: "Enabling [NTLM] authentication to a reverse proxy is not recommended . . . inserting a reverse proxy will cause NTLM authentication between the client browser and the Web server to cease functioning." The article goes on to recommend using the less secure Basic Authentication instead of NTLM, if a proxy server is involved.

According to one solution, since NTLM is an end-to-end authentication mechanism, the inclusion of a proxy in the transaction path requires two separate authentication steps: 1) between the client and the proxy, and 2) between the proxy and the server. Indeed, some have reverse-engineered the proprietary NTLM protocol and, as a result, have implemented a solution which requires additional configuration of the proxy as well as the Windows domain controller. These types of solution essentially moves the termination point of the NTLM connection from the server to the proxy. For example, Cacheflow provides a proxy that has an NTLM solution that requires the installation of software on the NT domain controller. This approach allows the proxy to terminate the server-end of the authentication, thus ensuring that there are no "hops" between the client and the authenticating NTLM server. This solution does not really act as a proxy for NTLM-based transactions; rather, it essentially takes over NTLM authentication from the NTLM server. In addition, this is not a transparent solution as it requires much setup and configuration on the proxy server and on the domain controller.

In light of the foregoing, a need in the art exists for methods, apparatuses and system that allow for transparent intermediation of network traffic over connection-based authentication protocols, such as NTLM. Embodiments of the present invention substantially fulfill this need.

SUMMARY OF THE INVENTION

The present invention provides methods, apparatuses and systems allowing for the transparent intermediation of network traffic over connection-based authentication protocols. In one embodiment, the present invention allows a proxy server to be placed into an NTLM or NTLMv2 environment and have it transparently ensure that NTLM transactions are handled appropriately, such that the proxy server can interact (optimize/accelerate) with the authenticated content without breaking the authentication scheme. Embodiments of the present invention provide a proxy server solution that is easily deployed and transparently fits into an existing NTLM environment.

Embodiments of the present invention dynamically detect and accommodate NTLM authenticated transactions as well as other authenticated and non-authenticated transactions. Embodiments of the present invention take advantage of the performance gains of using connection multiplexing for as many client requests as possible, whole using authenticated and tunneled connections for data flows associated with connection-based authentication mechanisms.

DESCRIPTION OF PREFERRED EMBODIMENT(S)

A. Exemplary Operating Environment

Figure 1:
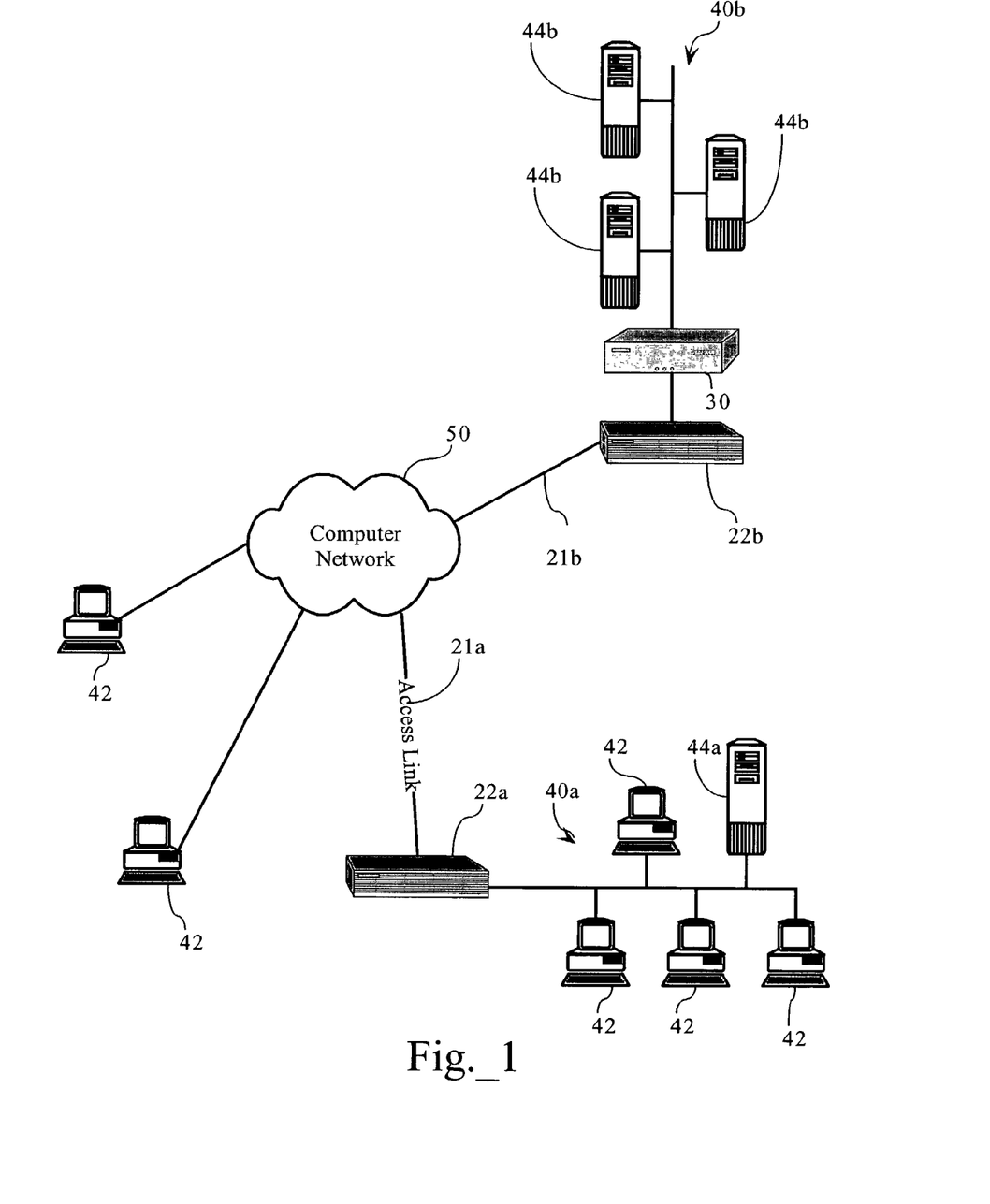
FIG. 1 is a functional block diagram illustrating a computer network environment including a network application optimization server according to an embodiment of the present invention.

FIG. 1 illustrates a packet-based computer network environment including a network application optimization server 30. As FIG. 1 shows, local area computer networks 40*a*, 40*b* each interconnect several TCP/IP end systems, including client devices 42*a* and server devices 44*a* and 44*b*, and provide access to resources operably connected to computer network 50 via routers 22*a*, 22*b* and access links 21*a*, 21*b*, respectively. Use of the letters "a", "b" after various reference numbers in the Figures is intended to clarify the associations between a particular local area network (40*a* and 40*b*) and the nodes, network devices, and other systems connected thereto. For purposes of description, the use of a reference number herein without a letter designation is intended to apply to all corresponding devices; for example, the term "server 44" is intended to encompass servers 44*a* and 44*b*. The computer network environment, including computer network 50 is a packet-based communications environment, employing TCP/IP protocols, and/or other suitable protocols, and has a plurality of interconnected digital packet transmission stations. As FIG. 1 illustrates, network application optimization server 30, in one embodiment, is provided between router 22*b* and local area computer network 40*b*. Network application optimization server 30 could also be placed within network cloud 50 or may reside directly on servers 44*b*. In one embodiment, the functionality associated with network application optimization server 30 may be integrated into a network or Internet appliance. As discussed, network application optimization server 30 may be part of a web or network server or may be a strand-alone device (as shown) between computer network 50 (e.g., the Internet or other network environment) and one or more servers 44*b*.

Servers 44, in one embodiment, are web or content servers operative to receive requests and transmit responses in return. In one embodiment, servers 44 are operative to transmit HTML page-based interfaces to client computers 42 having a browser over computer network 50. In one embodiment, servers 44 include functionality implementing the Hypertext Transport Protocol, as well as other protocols, such as the TCP/IP protocol suite. Servers 44*b*, in one embodiment, further implement a connection-based authentication mechanism, such as NTLM (see above), to control access to content and other data to authenticated clients. One of ordinary skill in the art, however, will recognize that server 44*b* may implement other connection-based authentication protocols.

Users access resources on servers 44*b* with a network access device which receives, displays and transmits data over a computer network. In one embodiment, a network access device is a client computer 42 executing a browser. However, other suitable network access devices include personal digital assistants (PDAs), internet-enabled cellular phones, and the like. Client device 42 can be any computer, special-purpose computing device, or any other suitable device for performing the required functionality. In one embodiment, client device 42 includes at least one processor, a data storage system (including volatile and nonvolatile media), a keyboard, a display, at least one input device and at least one output device. In one embodiment, the client device 42 is connected to computer network 50 via a modem dial-up connection, a T1 connection (e.g., xDSL) or through a local area network operably connected via an access link to computer network 50. Such communication, however, could also be wireless. In addition, although embodiments of the system are described as working in conjunction with a browser, any suitable device or application for receiving, displaying and transmitting data over a computer network can be used in the present invention. In one embodiment, the browser executed on client device 42 supports the SSL ("Secure Sockets Layer") protocol, the HTTPS ("Secure HTTP") protocol, or any other similar protocol for transmitting confidential or private information over an open computer network.

B. Network Application Optimization Server

As discussed more fully below, network application optimization server 30, in one embodiment, is operative to receive requests from client devices 42, determine attributes associated with client devices (e.g., connection speed, browser type, etc.), and optimize the deliver of content and other data resources associated with servers 44*b* in response to client requests. In one embodiment, network application optimization server 30 combines compression, conversion, connection multiplexing, and reverse proxy caching functionality to optimize delivery of content and other data to client devices 42. Network application optimization server 30, in one embodiment, is operative to convert resources (and sub-resources—i.e. individual embedded elements or objects of an HTML or other resource, such as an image file, etc.) associated with servers 44*b* into one or more resource variants optimized to a client device profile. A client device profile may include one to a plurality of attributes, such as connection speed, browser type, browser version, etc. In one embodiment, network application optimization server 30 includes the functionality described in U.S. patent application Ser. Nos. 09/684,372, 09/846,117, and 10/038,751.

Figure 2:
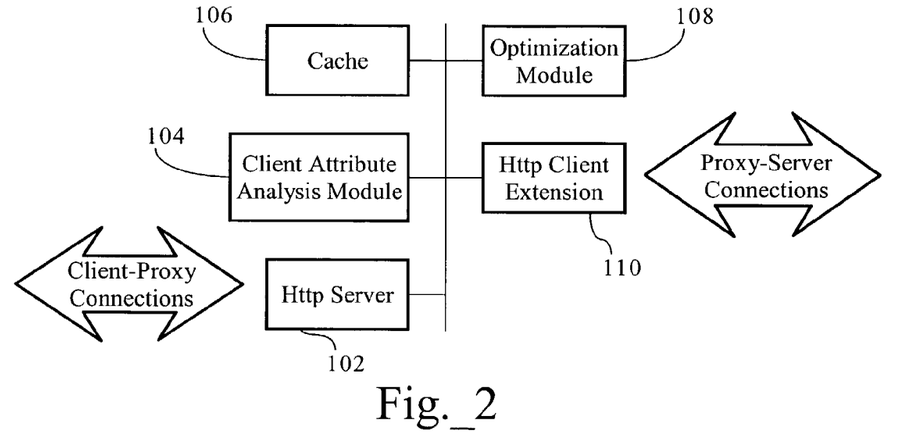
FIG. 2 is a functional block diagram setting forth the functionality of the network application optimization server according to an embodiment of the present invention.

FIG. 2 sets forth the functionality of network application optimization server 30 according to one embodiment of the present invention. As FIG. 2 shows, network application optimization server 30, in one embodiment, comprises http server 102, client attribute analysis module 104, application content cache 106, optimization module 108 and http client module 110. Http server 102 is operative to manage connections to client devices 42, as more fully described below, and construct request objects including attributes characterizing client requests received over the connections. Client attribute analysis module 104 is operative, in response to a client request, to identify at least one attribute associated with a client device 42 or the connection between http server 102 and client device 42. Application content cache 106 stores resources and sub-resources (e.g., data such as text files, image files, etc.) associated with servers 44*b* and resource variants optimized to different client device profile types (based on client attributes and connection attributes). Optimization module 108 is operative to transform resources and sub-resources into resource variants optimized to different client device profile types. Http client 110 is operative to establish and manage a plurality of connections to at least one origin server 44.

B.1. Http Server

Http server 102, in one embodiment, managers connections to client devices 42, reads data from sockets, and constructs request objects in a buffer accessible to other modules or handlers associated with network application optimization server 30. Request object attributes, in one embodiment, include the source IP address and port number, destination IP address and port number, client or browser type, uniform resource locator (URL), HTTP header section, HTTP body section (if any). Other request object attributes can include client connection speed, browser type and version, authentication or other header information, etc. In one embodiment, request objects further includes a flag or field indicating whether the client request includes an authentication header or other authentication attributes. In one embodiment, http server 102 further maintains, as to each resource associated with servers 44*b*, a list of modules or handlers (e.g., application content cache 106, optimization module 108, etc.) that have been configured to operate on client requests for that resource or sub-resource.

B.2. Client Attribute Analysis Module

Client attribute analysis module 104, in one embodiment, is operative to analyze the client request and the connection between http server 102 and the corresponding client device 42 in order to determine the optimal resource variants to be transmitted in response to client requests. In one embodiment, client attribute analysis module 104 operates on request object attributes stored in buffer memory to analyze the request object. In one embodiment, client attribute analysis module 104 further monitors and/or analyzes at least one characteristic associated with the client connection (e.g., connection speed) and stores metrics associated with the observed characteristics in the request object or in a data structure appended to the request object. U.S. application Ser. Nos. 09/684,372 and 10/038,751 disclose methods and systems for analyzing client, client request, and connection attributes to determine optimal resource variants. In one embodiment, client attribute analysis module 104 is operative to detect whether client requests involve a connection-based authentication scheme and to reserve an exclusive server connection from http client 110 to the appropriate origin server 44*b*, as discussed below.

B.3. Application Content Cache and Optimization Module

Optimization module 108 is operative to convert resources and sub-resources received from origin servers 44*b* into variants optimized to different client device profile types. In one embodiment, such resource variants are based on connection speed (low, medium and high), as well as browser types (indicating a set of capabilities (e.g., progressive rendering, supported file types, etc.) and known bugs). Application content cache 106 stages resources and sub-resources, as well as variants of these resources and sub-resources that are optimized to various client device profiles types. U.S. application Ser. Nos. 09/684,372 and 10/038,751 disclose methods and systems for converting resources and sub-resources into optimized variants, as well as staging such variants in a cache. U.S. application Ser. No. 10/038,751 further discloses "URL mangling" to change the URLs to sub-resources embedded in an HTML resource, for example, to refer to a particular sub-resource variant stored in application content cache 106.

B.4. Http Client

Http client 110 is operative to manage a plurality of exclusive and non-exclusive connections to at least one origin server 44*b* and to forward client requests over these server connections. In one embodiment, http client 110 is operative to maintain persistent HTTP connections with one or more origin servers 44*b* and multiplex client requests over such non-exclusive connections to reduce the overhead delays associated with TCP, such as acknowledgements and slow starts. In one embodiment, http client 110 is operative to select for a given client request an optimal connection from the plurality of non-exclusive server connections based on a variety of characteristics or metrics associated with the connections and client device profile type associated with the request. U.S. application Ser. No. 09/846,117 discloses systems and methods for managing non-exclusive connections between a proxy server and a destination server and selectively forwarding client requests along a connection to speed response times.

Figure 3:
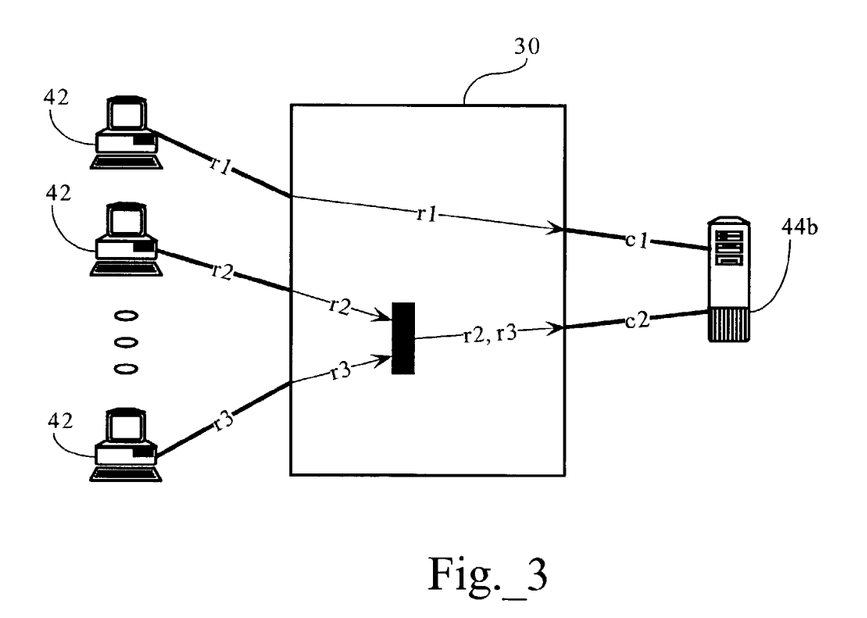
FIG. 3 is a functional block diagram illustrating operation of the network application optimization server according to an embodiment of the present invention.

As discussed below, http client 110 is also operative to maintain exclusive connections to server 44b for client requests from a particular client device 42 involving a connection-based authentication scheme. FIG. 3 is a functional diagram illustrating operation of http client 110, according to an embodiment of the present invention. For didactic purposes, assume that client request r1 is a request for a resource requiring authentication, while client requests r2, r3 do not require authentication. Assume further that network application optimization server 30 currently maintains persistent connections c1, c2 to origin server 44b. As FIG. 3 illustrates, http client 110 is operative to detect client requests implicating an authentication mechanism on server 44b and exclusively forward such requests over exclusive server connection c1. Http client 110, however, also operates to multiplex client requests r2, r3 to server 44b over non-exclusive server connection c2. One skilled in the art will recognize, however, that the small number of connections and requests is for didactic purposes only and that network application optimization server 30 is operative to establish and manage thousands of exclusive and non-exclusive server connections, and multiplex client requests from a large number of client connections to a smaller number of non-exclusive server connections to server 44b.

C. Operation

Figure 4:
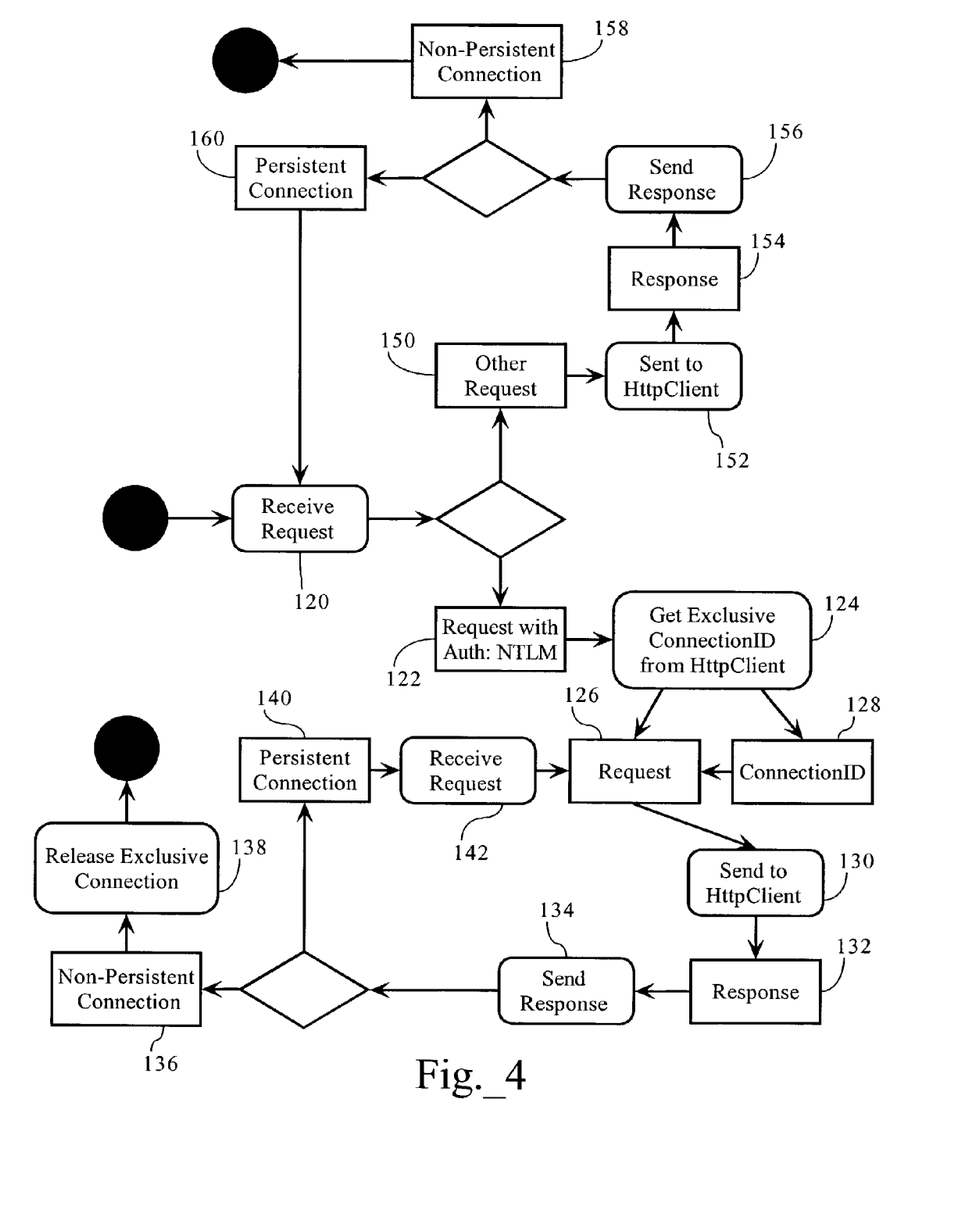
FIG. 4 is an activity diagram illustrating the handling of client requests according to one embodiment of the present invention.
Figure 5:
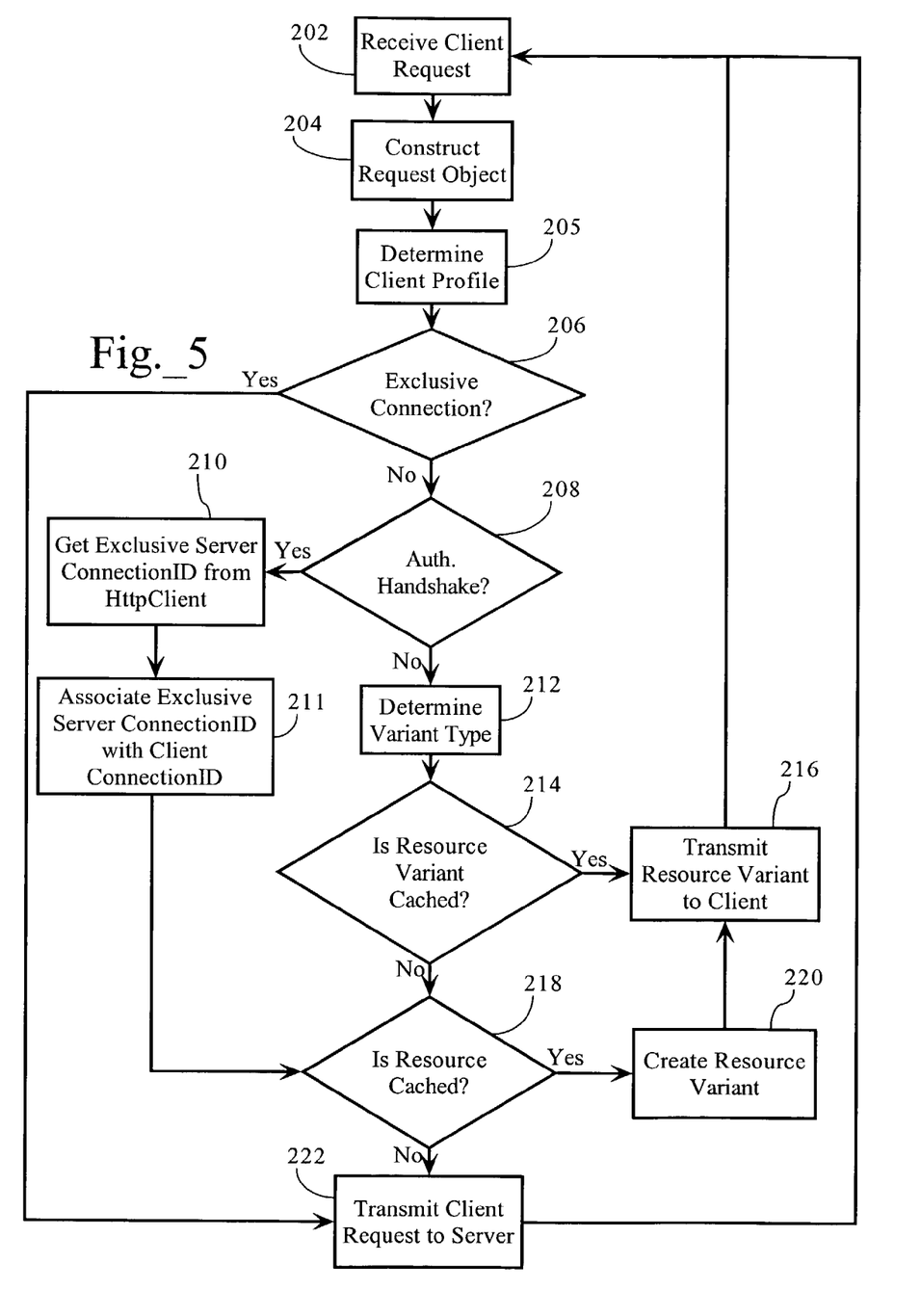
FIG. 5 is a flow chart setting forth a process flow associated with handling client requests.
Figure 6:
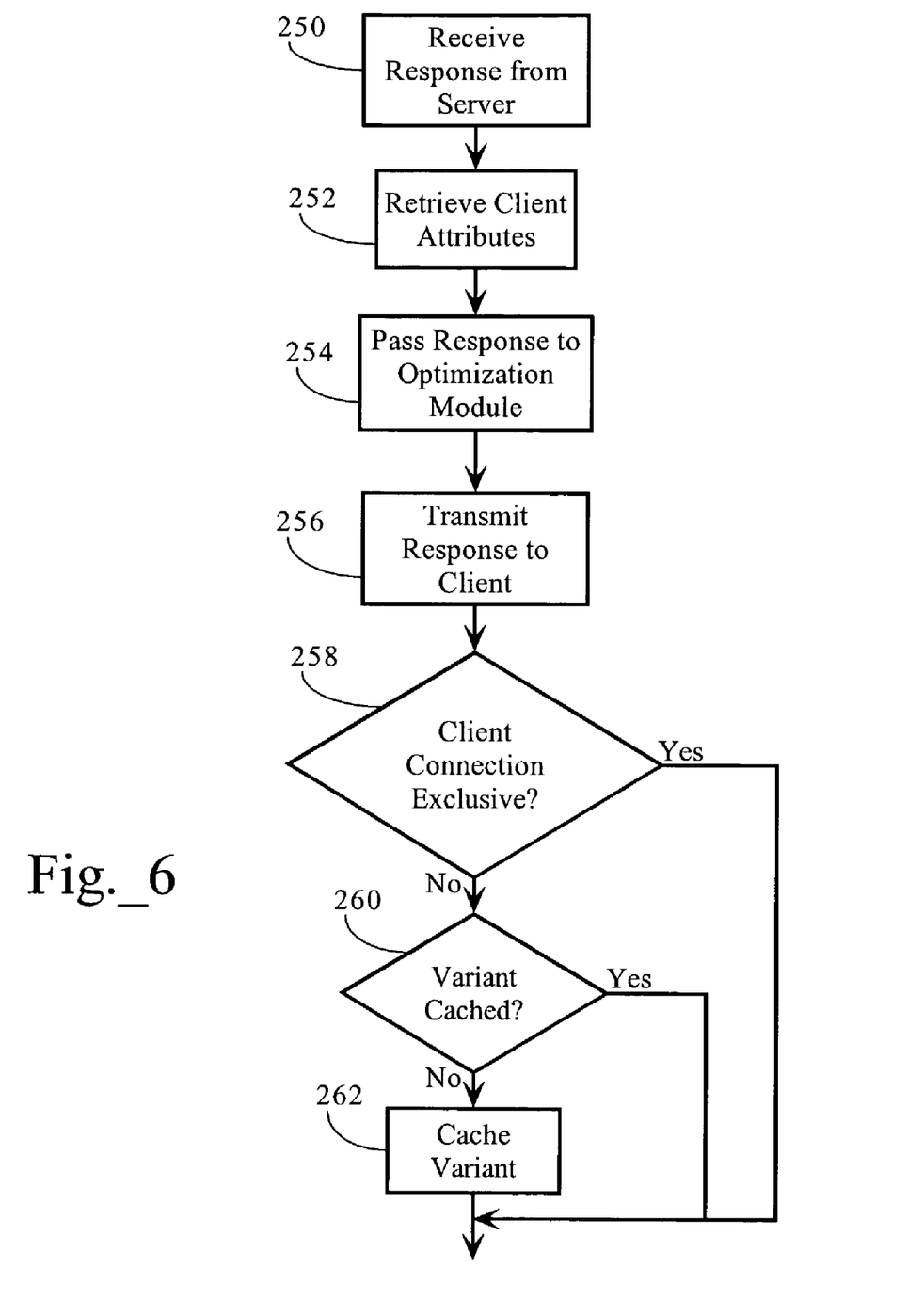
FIG. 6 is a flow chart diagram illustrating a process flow associated with processing responses received from an origin server.

FIGS. 4, 5 and 6 illustrate operation of network application optimization server 30 according to an embodiment of the present invention. FIG. 4 is an activity diagram showing the disparate treatment of client requests based upon detection of attributes associated with a connection-based authentication mechanism. As FIG. 4 provides, when network application optimization server 30 receives a request (120) and detects elements in the client request indicating an authentication handshake (122), an exclusive connection is reserved between network application server 30 and the origin server 44b (124). In one embodiment, the request (126) and an exclusive connection identifier (128) are passed to http client 110 (130), which transmits the request to the origin server 44b over the exclusive connection corresponding to the identifier. When a response is received from the origin server (132), network application optimization server 30 transmits the response to the client device 42 (134). As FIG. 4 shows, if the client connection is persistent (140), the process described above is repeated for subsequent client requests (142). If the connection is non-persistent (136), the exclusive connection is released (138). On the other hand, requests not involving a connection-based authentication scheme (150) are passed to http client 152, which as discussed above, may multiplex the request over a persistent connection to server 44b. When a response is returned (154), network application optimization server 30 transmits it to the corresponding client device 42 (156). FIG. 4 also illustrates handling of non-persistent (158) and persistent connections (160).

C.1. Client Request Handling

FIG. 5 sets forth a method associated with operation of network application optimization server 30 for handling client requests according to an embodiment of the present invention. As FIG. 5 illustrates, http server 102 receives a client request from client device 42 (step 202) and constructs a request object (step 204). In one embodiment, http server 102 constructs a request object in a buffer accessible to other handlers or modules associated with network application optimization server 30. Client attribute analysis module 104 then operates on attributes of the request object, as well as analyzes characteristics associated with the connection between the client device 42 and http server 102, to determine a client device profile (step 205). For example, client attribute analysis module 104 monitors the client connection to determine the connection speed associated with the client device. As discussed above, U.S. application Ser. Nos. 09/684,372 and 10/038,751 disclose methods and systems for analyzing client, client request, and connection attributes, such as connection speed, to determine optimal resource variants.

Http server 102, in one embodiment, determines whether the client connection over which the client request was received is associated with an exclusive server connection identifier (see below) (step 206). If so, http server 102 passes the client request and the exclusive server connection identifier to http client 110 for transmission to server 44b over the exclusive server connection corresponding to the identifier (step 222). Otherwise, client attribute analysis module 104 analyzes elements of the client request to determine whether it implicates a connection-based authentication mechanism implemented by server 44b (step 208) (see below). If the client request is part of a connection-based authentication scheme, client attribute analysis module 104 signals http client 110 which returns an exclusive server connection identifier (step 210). Client attribute analysis module 104 then associates this exclusive server connection identifier with the client connection between client device 42 and http server 102 (step 211). Client attribute analysis module 104 then passes the client request and exclusive server connection identifier to http client 110 for transmission to server 44b over the corresponding exclusive connection (step 222). As FIG. 5 shows, if the request is not associated with a connection-based authentication handshake, client attribute analysis module 104 determines the optimal variant type for the resource or sub-resource identified in the client request (step 212).

Processing of the request, in one embodiment, is then transferred to application content cache 106, which determines whether the identified resource/sub-resource variant has been cached (step 214). If so, the cached resource/sub-resource variant is passed to http server 102 for transmission to client device 42 (step 216). Otherwise, application content cache 106 determines whether the resource or sub-resource has been cached (step 218) and, if so, passes the resource or sub-resource to optimization module 108. Optimization module 108, in one embodiment, creates the resource variant based upon the resource and the client device profile (step 220) and passes the resource variant to http server 102 (see step 216). In an alternative embodiment, optimization module 108 performs a trade-off analysis to determine whether a resource variant should be created based upon client device profile attributes and possible performance gains resulting from the resource variant. U.S. application Ser. No. 09/684,372 discloses methods and systems for analyzing whether the performance benefit of the resource variant outweighs the costs associated with creating the resource variant. Lastly, if neither the resource/sub-resource or variant is cached, the client request is passed to http client 110, which transmits the client request to server 44b (step 222).

Client request objects remain in the buffer to enable subsequent processing of responses transmitted from the origin server 44b. As discussed above, client requests associated with an exclusive server connection identifier are transmitted over the corresponding exclusive server connection. Regular client requests are treated as discussed above, such as for possible multiplexing over one of a plurality of persistent, non-exclusive server connections maintained by http client 110.

C.2. Server Response Handling

FIG. 6 illustrates a method, according to one embodiment of the present invention, for handling responses transmitted from server 44b to network application optimization server 30. Specifically, http client 110 receives a response from origin server 44b (step 250) and retrieves the request object associated with the response (step 252). Http client 110 then passes the response to optimization module 108 (step 254). As discussed above, optimization module 108 is operative to determine a resource variant that is optimized to the client device profile associated with the response and create the resource variant. U.S. application Ser. No. 09/684,372 discloses methods and systems for transforming resources/sub-resources into resource variants optimized for a client device profile, as well as methods for analyzing the trade-offs between the expected performance gains of the resource variant and the costs associated with creating the resource variant. The requested resource or resource variant is then passed to http server 102. Http server 102 transmits the response to the corresponding client device 42 and, in one embodiment, releases or deletes the request object from the buffer.

As FIG. 6 demonstrates, since network application optimization server 30 merely intermediates and/or accelerates data flows over connection-based authentication protocols, and does not itself authenticate client devices, it does not cache any resource/sub-resource requiring authentication. In one embodiment, after the response is transmitted, http server 102 determines whether the resource should be cached. In one embodiment, if the virtual connection between the client device 42 and the server 44b was exclusive (step 258), the resource/resource variant is not cached as access to it requires authentication. Otherwise, if the resource/sub-resource variant has not already been cached (step 260), it is stored in application content cache 106 for possible use in connection with generating responses to subsequent client requests (step 262).

C.3. Detection of Authentication Handshake

As discussed above, network application optimization server 30, employing the functionality discussed above, is operative to transparently intermediate data flows between clients and origin servers over a connection-based authentication protocol, such as the NTLM or NTLMv2 authentication scheme. A necessary component of this process is the detection of the authentication handshake associated with the NTLM authentication scheme and the establishment of an exclusive, virtual end-to-end connection between the client device 42 and the server 44b at an appropriate time during the authentication handshake.

When a client device 42 must authenticate itself to server 44b using the NTLM authentication scheme, a 4-way handshake takes place. That is, NTLM server 44b responds to a first GET or other request for a resource requiring authentication with an authentication challenge. The client device 42 responds to the challenge with a second GET request that includes an authorization response in an NTLM header. According to the NTLM scheme, the NTLM header in the subsequent client request includes "Authorization: NTLM <base64-encoded type-1-message>", including the host name and domain name of the client device 42. The NTLM server 44b responds with a "401 Unauthorized" response including the NTLM challenge: "WWW-Authenticate: NTLM <base64-encoded type-2-message>." Client device 42 responds to this message with a third GET request including an NTLM header with "Authorization: NTLM <base64-encoded type-3-message>," containing the user-name, host name, the domain name, and hashes of the previous type 1 and 2 messages.

According to one embodiment of the present invention, network application optimization server 30, upon detection of the second client request (above) with the "type 1" NTLM message, reserves an exclusive server connection to the NTLM server 44b to ensure that the second and third requests of the NTLM handshake, as well as all subsequent requests received from the client device over the client connection to http server 102 are sent on the same connected socket to server 44b. Detection of this request can be performed by scanning client requests for the "Authorization: NTLM" header. Since the NTLM authentication scheme is connection-based, network application optimization server 30, as discussed above, maintains an exclusive, persistent connection to the server 44b, using either the HTTP/1.0 keep-alive or HTTP/1.1 persistent connections (depending on the version of the HTTP protocol implemented by server 44b). Furthermore, once the socket or connection is established and the client device 42 authenticated, any further client requests on that socket do not need to be further authenticated. The method illustrated in FIG. 5, as well as the activity diagram of FIG. 3, illustrates this operation as client requests associated with exclusive server connections are forwarded to the origin server over the exclusive server connection.

In addition, according to the HTTP/1.1 Specification (Rev. 6), each terminating system or hop in a communications path (including a proxy) should insert a "VIA" header including an identifier for the system. However, the presence of the VIA header in a client request changes the behavior of NTLM servers. That is, the presence of the VIA header causes the NTLM server to issue a new authentication challenge in response to the request. Therefore, according to one embodiment of the present invention, network application optimization server 30 is configured to omit insertion of the VIA header at least for client requests transmitted over exclusive server connections to the server 44b to avoid the overhead associated with having to perform the NTLM handshake for every request.

As discussed above, the present invention can be applied to transparently intermediate any connection-based authentication scheme. One of ordinary skill in the art will know how to configure network application optimization server 30 to detect the authentication handshake associated with other connection-based authentication schemes based on one or more attributes of the authentication messages associated with the handshake. Further, one of ordinary skill in the art will recognize that other connection-based authentication schemes may require establishment of an exclusive, virtual end-to-end connection at other points in the authentication handshake.

C.4. Management of Non-Exclusive and Exclusive Server Connections

In order to provide a proxy mechanism to support a connection-based authentication scheme such as NTLM, network application optimization server 30 operates, as described above, to provide implicit end-to-end state between a connected client device 42 and the destination origin server 44b. Since NTLM authenticates on a per-connection basis rather than a per-request basis, network application optimization server 30 ensures that authenticated connections established with the origin server 44b are only used for requests emanating from the client connection that provoked the authentication of the connection in the first place. In one embodiment, network application optimization server 30 employs a tunneling mechanism, according to which requests received from a client connection are the only requests sent out on an authenticated server connection. In addition, network application optimization server 30, in one embodiment, also ensures that two client requests from the same client device via two separate client connections are never sent on the same authenticated server connection.

As discussed above, http client 110 manages a plurality of connections to at least one server 44b, some of which are exclusive server connections, while others are non-exclusive server connections which can be used in a connection multiplexing scheme. To facilitate management of these connections and the disparate treatment of exclusive and non-exclusive connections, http client 110 maintains a pool of non-exclusive http connection objects and a second pool of exclusive http connection objects. In one embodiment, when http client 110 opens a new socket it associates the connection with either one of these pools as appropriate. U.S. application Ser. No. 09/846,117 teaches management of non-exclusive server connections and methods for efficiently forwarding client requests over such connections to an origin server.

Exclusive server connections involving NTML or potentially other connection-based authentication schemes, however, require a slightly different management scheme. In one embodiment, network application optimization server 30 maintains a plurality of non-exclusive server connections which can remain open after the client connection between client device 42 and network application optimization server 30 has closed. In contrast, with an exclusive server connection, when client device 42 initiates closing of the socket with network application optimization server 30, the exclusive server connection is closed and released from the pool. In addition, while client requests received over different client connection can be multiplexed over non-exclusive server connections, network application optimization server 30 maintains a one-to-one relationship between a particular client device 42 and a corresponding exclusive server connection.

D. Alternative Operating Environments

Figure 7:
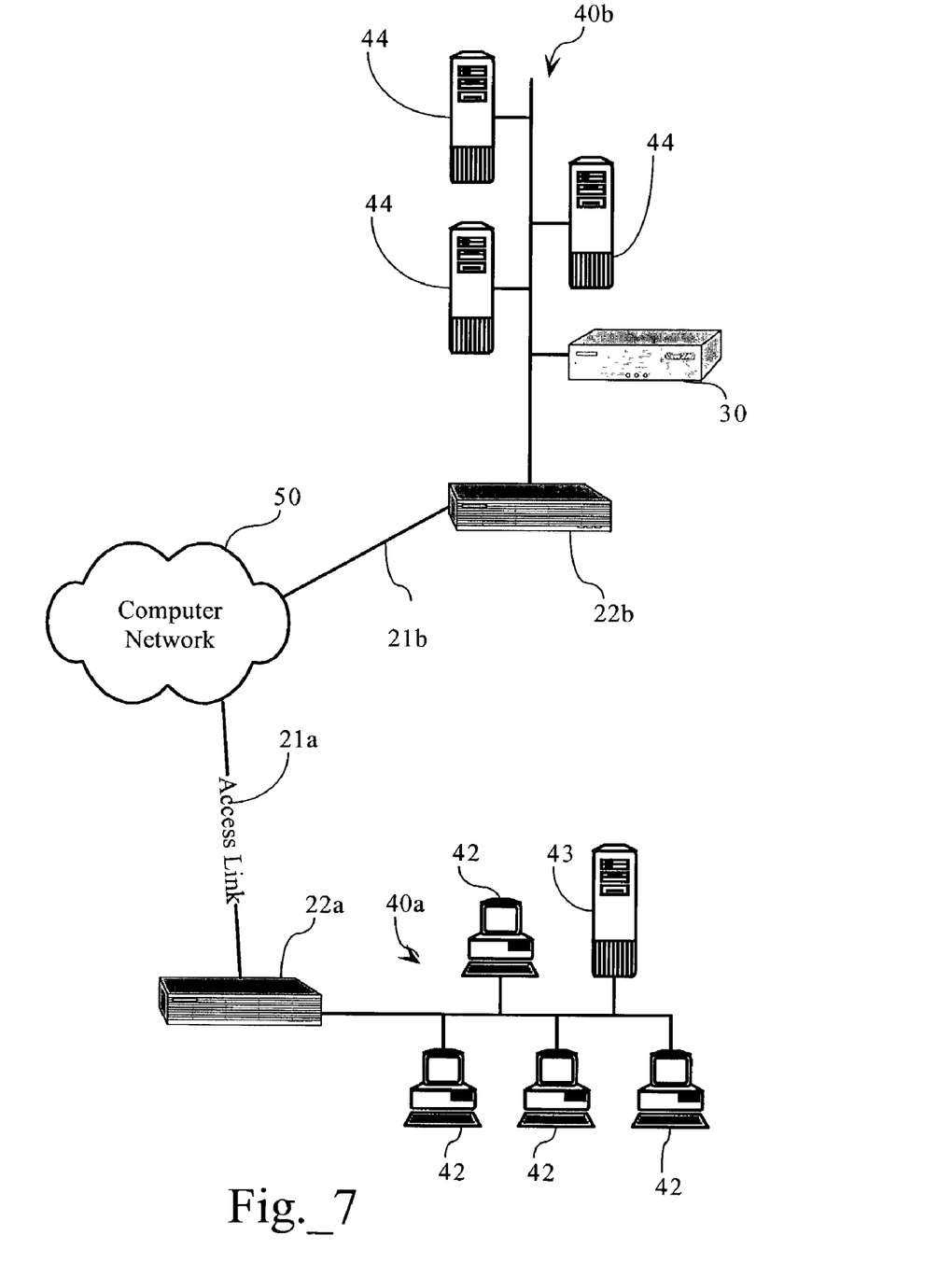
FIG. 7 is a functional block diagram illustrating a computer network environment including a network application optimization server according to another embodiment of the present invention.

FIG. 7 illustrates a computer network environment featuring an alternative deployment for network application optimization server 30. FIG. 1 illustrates an "inline" deployment according to which network application optimization server 30 is installed between servers 44b and access link 21b. FIG. 7, on the other hand, illustrates a "non-inline" deployment of network application optimization server 30. According to this non-inline deployment configuration, client requests are diverted to network application optimization server 30, which in turn forwards such client requests to servers 44b, if appropriate. In addition, responses from servers 44b are also diverted back to network application optimization server 30 for processing.

In an explicit, non-inline deployment mode, public DNS entries are configured such that network traffic otherwise destined for origin servers 44b are routed to network application optimization server 30. Network application optimization server 30 accesses an internal Hosts table, or a private DNS server, to resolve the IP addresses of the origin servers 44b. In a transparent, non-inline deployment, a device such as a router or a layer-four switch (not shown in FIG. 7) directs client requests from client devices 42 to network application optimization server 30. Network application server 30 is configured to have knowledge of the actual IP addresses of origin servers 44b so that it can access them for resources and/or sub-resources to be optimized.

Lastly, although the present invention has been described as operating in connection with end systems and proxies employing the HTTP, TCP and IP protocols, the present invention has application in computer network environments employing any suitable session layer, transport layer and network layer protocols. The present invention can also be applied as a mechanism for intermediating connection-based authentication mechanism in a secure environment, such as Secure Sockets Layer (SSL) network traffic. U.S. patent application Ser. No. 09/967,481 discloses the optimization of network traffic over secure communication protocols, such as SSL. In addition, although embodiments of the present invention have been described as operating in connection with NTLM authentication, the present invention can be applied to transparently intermediate any connection-based authentication scheme. Moreover, the present invention can be applied to wireline computer networks, wireless computer networks, or a combination of both. Accordingly, the present invention has been described with reference to specific embodiments. Other embodiments of the present invention will be apparent to one of ordinary skill in the art. It is, therefore, intended that the claims set forth below not be limited to the embodiments described above.

What is claimed is:

1. A method allowing for transparent intermediation of data flows over connection-based authentication schemes, comprising maintaining, at a proxy server, at least one non-exclusive persistent connection to at least one origin server;

establishing, at the proxy server, client connections with respective client devices responsive to receipt of corresponding client requests, wherein the client requests designate respective origin servers;

if the client request includes an element associated with a connection-based authentication handshake for a transaction between the client and the origin server;

for each received client request that includes an element associated with a connection-based authentication handshake for a transaction between the client and the origin server, establishing an exclusive server connection between the proxy server and the origin server, wherein the exclusive server connection is exclusively for the transaction, associated with the connection-based authentication handshake, between the client and the origin server, and is not used for any other transactions, and forwarding the client requests request to the origin server over the respective exclusive server connections;

else, multiplexing received client requests to the origin server over a selected one of the at least one non-exclusive persistent connection to the origin server, if the client requests do not include an authentication element.

2. The method of claim 1 wherein the at least one non-exclusive connection is a persistent HTTP connection.

3. The method of claim 1 wherein the exclusive server connection is a persistent connection.

4. The method of claim 1 wherein the exclusive server connection is a persistent HTTP connection.

5. The method of claim 1 further comprising closing the exclusive server connection when the client connection is closed.

6. The method of claim 1 wherein the connection-based authentication scheme is NTLM.

7. The method of claim 6 wherein the element comprises an element associated with an NTLM authentication handshake.

8. The method of claim 7 wherein the element comprises an NTLM header.

9. The method of claim 8 wherein the NTLM header comprises a NLTM authorization message.

10. The method of claim 1 further comprising
 forwarding subsequent client requests received over the client connection to the origin server over the exclusive server connection.

11. The method of claim 5 further comprising
 forwarding subsequent client requests received over the client connection to the origin server over the exclusive server connection.

12. The method of claim 1 further comprising
 receiving a response to the client request from the origin server over the exclusive server connection; and
 forwarding the response to the client over the client connection.

13. The method of claim 12 further comprising
 detecting at least one attribute associated with the client device;
 optimizing the response receive from the origin server based on the at least one attribute.

* * * * *